US006468461B1

United States Patent
Sumiyoshi et al.

(10) Patent No.: US 6,468,461 B1
(45) Date of Patent: Oct. 22, 2002

(54) PROCESS FOR FORMING SHEET PRODUCTS

(75) Inventors: Koji Sumiyoshi, Chiba (JP); Keiichi Ueba, Chiba (JP)

(73) Assignee: Chiba Machine Industry Corporation (JP)

( * ) Notice: Subject to any disclaimer, the term of this patent is extended or adjusted under 35 U.S.C. 154(b) by 0 days.

(21) Appl. No.: 09/534,890

(22) Filed: Mar. 24, 2000

Related U.S. Application Data (62) Division of application No. 09/028,339, filed on Feb. 24, 1998, now Pat. No. 6,077,065.

(30) Foreign Application Priority Data

Feb. 28, 1997 (JP) ............................................. 9-62254
Oct. 16, 1997 (JP) ............................................. 9-299479

(51) Int. Cl.[7] ...................... B29C 43/24; B29C 43/46; B29C 43/58
(52) U.S. Cl. ...................... 264/280; 264/175; 264/313; 425/327; 425/368; 100/162 B; 100/334; 100/336; 492/7; 492/16; 492/47
(58) Field of Search ............................ 425/4 C, 817 C, 425/368, 363, 327; 264/280, 299, 313, 555, 570, 572, 175; 100/162 B, 334, 336, 170; 492/47, 7, 16

(56) References Cited

U.S. PATENT DOCUMENTS 3,570,054 A    3/1971  Seanor et al.
3,570,735 A  * 3/1971  Kurz .......................... 225/96.5
3,707,749 A    1/1973  Henley ....................... 29/113 R
4,000,242 A  * 12/1976 Harbauer ................ 100/163 R
4,233,011 A  * 11/1980 Bolender et al. ....... 100/162 B
4,607,420 A  *  8/1986 Vomhoff .................. 100/162 B
4,860,964 A  *  8/1989 Ishii et al. ..................... 226/19
5,263,840 A  * 11/1993 Heitmann et al. .......... 100/170
5,295,805 A  *  3/1994 Akamatsu et al. ............ 165/89
5,484,370 A    1/1996  Jenke et al. .................... 492/4

FOREIGN PATENT DOCUMENTS

EP        0 165 750 A2   12/1984
EP        0 716 911 A2    6/1996
JP        A 06-166089     6/1994
JP        A 06 170919     6/1994

* cited by examiner

Primary Examiner—Jan H. Silbaugh
Assistant Examiner—Michael I. Poe
(74) Attorney, Agent, or Firm—Woodbrige & Associates, P.C.; Richard C. Woodbridge (57) ABSTRACT

In a process and apparatus for producing long plastic sheets by pressing molten plastic materials between the forming roller and the forming drum unit, the forming drum unit including a thin cylindrical sleeve supported from inside by a drum support unit and pressed against the outer surface of the forming roller to deform elastically in a curve along the outer surface of the forming roller as it rotates, thus maintaining a relatively long contact length.

2 Claims, 10 Drawing Sheets

PROCESS FOR FORMING SHEET PRODUCTS

This applicational is a divisional of Ser. No. 09/028,339, filed Feb. 24, 1998 now U.S. Pat. No. 6,077,065.

BACKGROUND OF THE INVENTION

1. Field of the Invention

The invention relates to a process and apparatus for forming long and thin sheet products, more specifically, a process and apparatus for continuously forming sheet products in such a way as to produce flat, mirror-finished surfaces or surfaces with specific patterns.

2. Description of Related Art

Long sheet products such as plastic sheets or films (hereinafter may be referred to simply as "plastic sheets") have hitherto been produced by forming molten plastic materials into desired shapes by means of extrusion forming devices.

Such an extrusion forming device is not intended to roll molten plastic materials coming out of a die for the formation, but rather to give a specific surface finish such as mirror-finish to surfaces of plastic sheets having a predetermined thickness extruded from the die. The forming process is, for example, composed of transporting and processing plastic sheets through a series of equipment such as surface finishing rolls, an annealing unit, a take-up roll unit, a transport unit, and an edging machine.

The molten plastic material, after being formed into a plastic sheet of a desired thickness passing through the above-mentioned series of equipment, is cut to size by a cutting machine and stacked, or taken up by a take-up roll.

Various means have been used to adjust the thickness this formed plastic sheet, for example, die lip adjustment, or adjustment of the gap between the surface finishing rolls in case of a thicker sheet.

In case of a thinner sheet, a typical means has been either the air knife method, which is a method of pressing molten film-like plastic materials against the cast drum using pressurized air from a nozzle, the touch roll method, which is a method of adjusting the touch of the rubber roll against the forming roll, or the pressure forming method using a cast drum and an endless metal belt, which is a method of feeding thermoplastic materials between the cast drum and the endless metal belt wherein the plastic materials are sandwiched between the drum and the belt abutting against the drum outer surface in an arc and cooled to be formed into desired shapes (ref. to JP-A-06-166089 and JP-A-06-170919).

However, the air knife method has a problem that air pockets are generated between the molten plastic materials and the forming roll and thus make it difficult to obtain uniform plastic sheets with smooth surfaces.

The touch roll method has a problem that it is difficult to produce sheets with high degree of mirror-finishes or sheets with patterns because, as the surface of the touch roll itself is made of rubber, the roll surface tends to be easily damaged and the damage mark gets copied onto the plastic sheets, or the plastic sheets stick to the rubber roll surface when it gets hot.

The pressure forming method has a problem that, in order to produce plastic sheets with uniform, mirror-finished surfaces, special techniques are needed to smoothen the surface of the joining part of the belt. As a result, the endless metal belt turns out to be expensive and the products become expensive as well.

The metal endless belt is not only expensive, but also long (4–5 [m]) and heavy (20–40 [kg]), so that it has a disadvantage of having to deal with cumbersome replacement and tensioning of the belt when it becomes necessary to replace the belt due to wears, etc. If the product lengths are short and a large varieties of surface patterns have to be produced, i.e., in case of a large-variety-small-lot production, the belt has to be replaced frequently, productivity drops due to the cumbersome belt replacement procedure, and consequently the products becomes more expensive.

SUMMARY OF THE INVENTION

The first objective of the present invention is to provide a process and apparatus for securely and efficiently forming sheet products, which prevents air pockets from being induced into the contact area, and which produces uniform flat, mirror-finished surfaces or surfaces with specific patterns.

The second objective is to provide a process and apparatus for forming sheet products with good finish accuracy by easily correcting any positional deviations that might occur in the forming drum unit when a long sheet product with strong adhesive properties is formed for a long period of time continuously without applying an excessive external force to the forming drum unit.

The third objective is to provide an apparatus with good durability for forming sheet products by correcting the positional deviations without causing any damages to the forming drum unit.

The fourth objective is to provide an apparatus for forming sheet products that is easy to handle, provides a good surface finish on both sides, and can produce the products inexpensively even in case of a large-variety-small-lot production.

The fifth objective is to provide an apparatus for forming sheet products that causes little fluctuations of rotation and no unnecessary temperature rise during forming of molten plastic materials, produces good quality products, has simple structure, and can be easily maintained.

In order to accomplish the objectives, the present invention is an apparatus for forming long sheet products by rolling, which comprises: a forming mechanism composed of a forming roller rotatably supported at a fixed position and a forming drum unit capable of approaching to or receding from an outer surface of the forming roller and having a thin sleeve supported from inside by a drum support unit so as to press materials between the forming roller and the forming drum unit, the sleeve pressed against the outer surface of the forming roller with a desired force to deform elastically in a curve along the outer surface of the forming roller.

In order to accomplish the objectives, the present invention is a process for forming long sheet products by pressing materials between a forming roller and a forming drum unit capable of approaching to or receding from an outer surface of the forming roller, which comprises: pressing the forming drum unit against the outer surface of the forming roller to deform elastically in a curve along the outer surface of the forming roller and, if the forming drum unit develops positional deviations while the sheet products are transferred and pressed between the forming roller and the forming drum unit, tilting the forming drum unit relative to a transfer direction in order to correct the positional deviations and continue the pressing and formation of the products.

The objects, features, and characteristics of this invention other than those set forth above will become apparent from the description given herein below with reference to preferred embodiments illustrated in the accompanying drawings.

DESCRIPTION OF THE PREFERRED EMBODIMENT

The constitution of the first embodiment will be explained below referring to the drawings.

Figure 1:
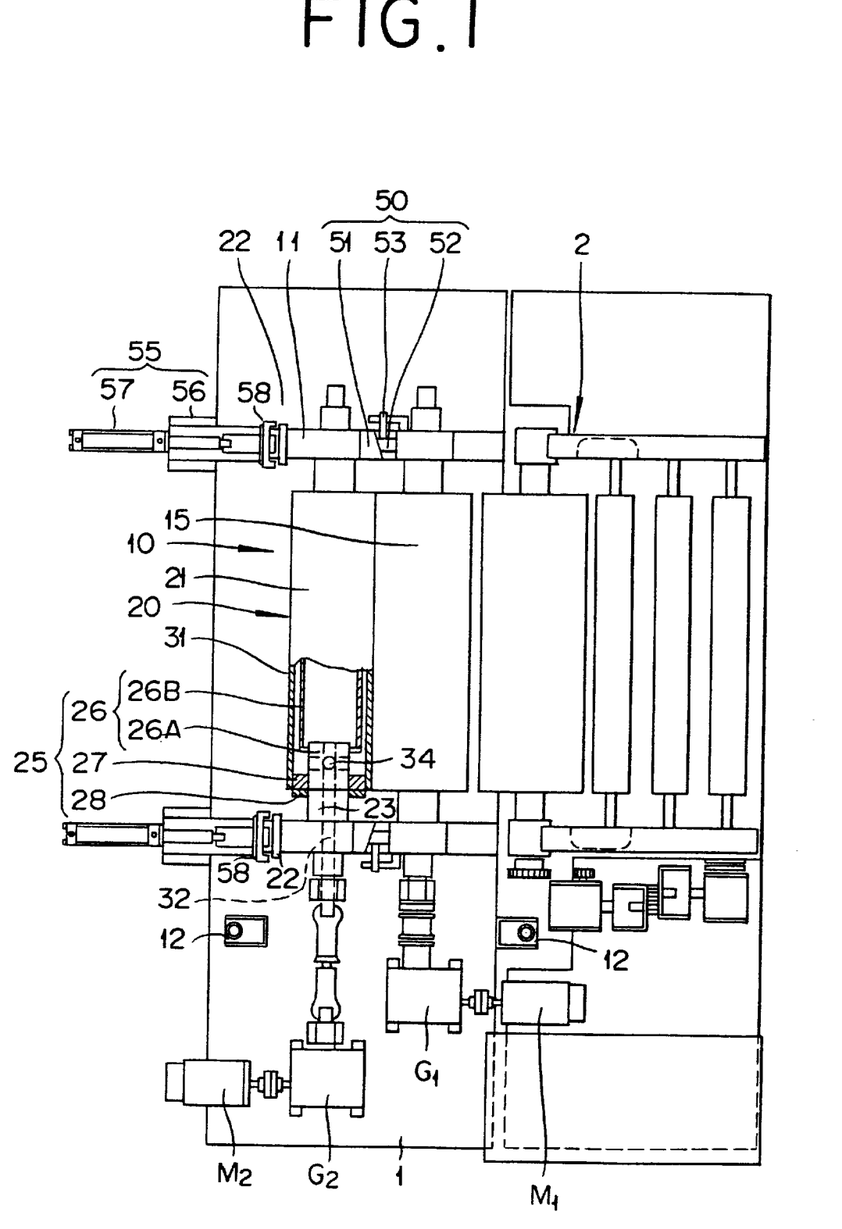
FIG. 1 is a partial cutaway plan view of the first embodiment of the invention.

In FIG. 1, the item 1 is a base frame placed on a proper mounting surface in such a way as to be movable freely. Mounted on this base frame 1 is an annealing unit 2 consisting of an appropriate number of annealing rollers to cool and form plastic sheet S shaped to a desired thickness by means of a forming mechanism 10.

This forming mechanism 10 is provided in front of the base frame 1 and can be raised or lowered to approach or recede from a die 3 that supplies molten plastic material W, such as molten polypropylene and molten polyethylene.

Figure 2:
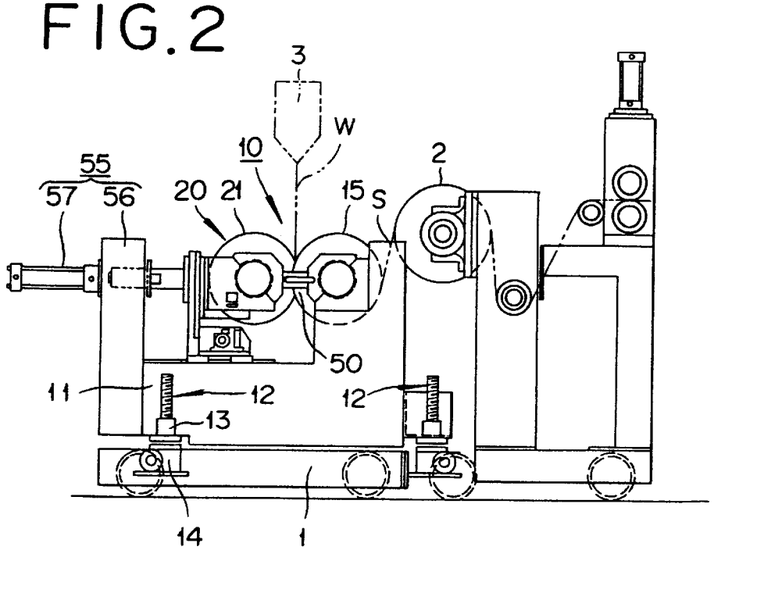
FIG. 2 is a partial cutaway side view of the embodiment.

This forming mechanism 10 comprises, as shown in FIG. 2, forming base blocks 11 that are capable of being raised or lowered to approach or recede from the die 3, a forming roller 15 that is supported in a fixed position rotatably on the forming base blocks 11, and a forming drum unit 20 that abuts against a portion of outer surface of this forming roller 15 in an arc.

The forming base blocks 11 are formed in an L-shape with a high front part (the right side of FIGS. 1 and 2, i.e., the annealing side) and a low rear part (the left side of FIGS. 1 and 2). On both the front and rear side of the forming base blocks 1, guide means 13 that slide up and down are provided, so that the base block can be adjusted up or down by means of jack units 12 which are driven by motors.

The forming roller 15 is supported rotatably between forming base blocks 11 by bearings provided at fixed positions on the front and top surface of each forming base block 11 on right and left. If necessary a temperature control mechanism (not shown) can be provided to heat or cool the forming roller 15 by means of circulating water or other fluid through it. The forming roller 15 is driven by a motor M1 through a reduction mechanism G1 at a reduced speed.

The forming drum unit 20 includes a thin pipe, a thin sleeve or other components on the periphery, particularly, a sleeve 21 which has some elasticity to deform inward when an external force is applied in a radial direction.

This sleeve 21 is typically a seamless thin annular member having a mirror-finished outer surface, a thickness of 50–1000 [$\mu$m] (preferably 200–400 [$\mu$m]) and a diameter of 10–200 [cm] (preferably 15–30 [cm]), and is made of such a material as stainless steel or nickel. The sleeve 21 is produced by a process such as peeling a thin layer plated on the surface of an electrode, but the detail of such a process is not related directly to the present invention so that it will not be discussed here.

The present invention is limited neither to the section thickness, diameter of the sleeve 21 and the length of the forming drum face, nor to the material. In fact, it can be made of any metal, plastic or other material.

The surface of this sleeve 21 is mirror-finished if it is used to form a flat plastic sheet S, or formed with a convexo-concave pattern to be copied if it is used to form a patterned plastic sheet S.

In any case, the plastic sheet S of a specific thickness is formed, depending on the flexibility of the forming drum unit 20, the contact with the forming roller 15 and the clearance from the surface of the forming roller 15.

Although the forming drum unit 20 is driven by a motor M2 through a reduction mechanism G2 in synchronization with the forming roller 15 in this embodiment, it can also be driven by the forming roller 15 as a slave without using the motor M2. This forming drum unit 20 is supported by a drum support unit 25, which will be explained later, and this drum support unit 25 can be slid back and forth relative to the forming roller 15 by means of a pressure adjustment unit 50 and a slide adjustment unit 55.

The drum support unit 25 comprises a drum support shaft 26 that is rotatably supported by bearings 23 affixed to the right and left side slide frames 22, and an expanding support bag 31 that is attached to the drum support shaft 26 and expands by means of a fluid such as liquid or gas, which is supplied in its inside, and supports the slide 21 on its outside circumference.

The example of the drum support unit 25 shown in FIGS. 1 through 5 is supported via its shafts 26A on the right and left sides by bearings 23, while a closed-end cylinder 26B connects between the shafts 26A located on both ends, together constituting a drum support shaft 26. Right and left support plates 27 are affixed to the right and left shaft 26A respectively and are covered by the expanding support bag 31, wherein the ends of the expanding support bag 31 are clamped between the outer circumferences of the support plates 27 and a disk-shaped, or doughnut-shaped clamp plate 28 and affixed by screws, etc.

A fluid supply passage 32 is formed at least in one of the shafts 26A to supply the fluid for the sleeve into the expanding support bag 31. And the fluid supply passage 32 opens as an inlet port 33a (ref. to FIG. 4) at the end of the shaft 26A, while an appropriate number of outlet ports 34a into the expanding support bag 31 are provided on the shaft 26A between the bottom plate of the cylinder 26B and the support plate 27.

Figure 4:
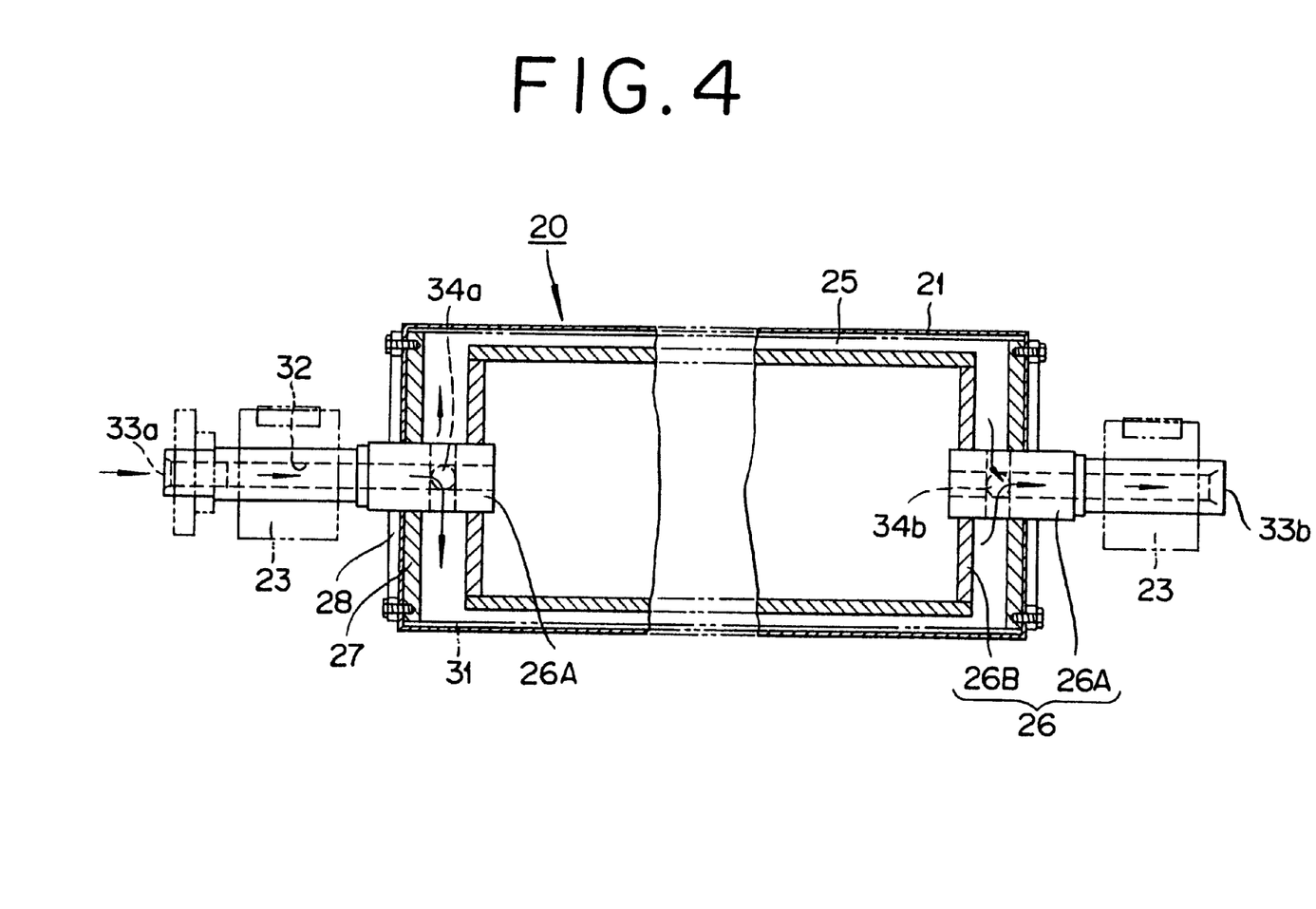
FIG. 4 is a sectional view of forming drum unit.
Figure 5:
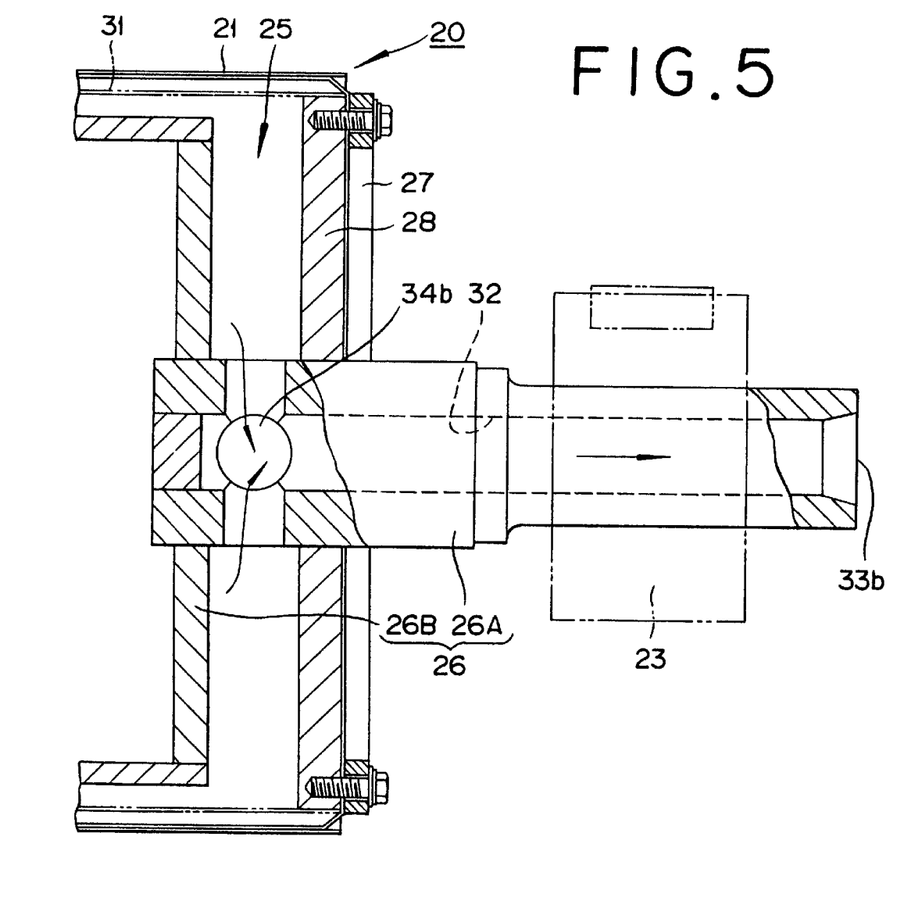
FIG. 5 is an enlarged sectional view of the essential part of FIG. 4.

Therefore, the expanding support bag 31 expands when the fluid for the sleeve is supplied to the inside of the expanding support bag 31 via the inlet port 33a, the fluid supply passage 32, and outlet port 34a. As a result, the sleeve 21 provided on the outside of the expanding support bag 31 will be supported by the expanding support bag 31 from the inside. The outer surface of the sleeve 21 flexes inward elastically along the outer surface of the forming roller 15, when it abuts against the outer surface of the forming roller 15.

The fluid for the sleeve is preferably sealed in the sleeve 21 and, if necessary, can also be so arranged to flow through with a provision of a drain 34b or an outlet 33b.

Figure 6:
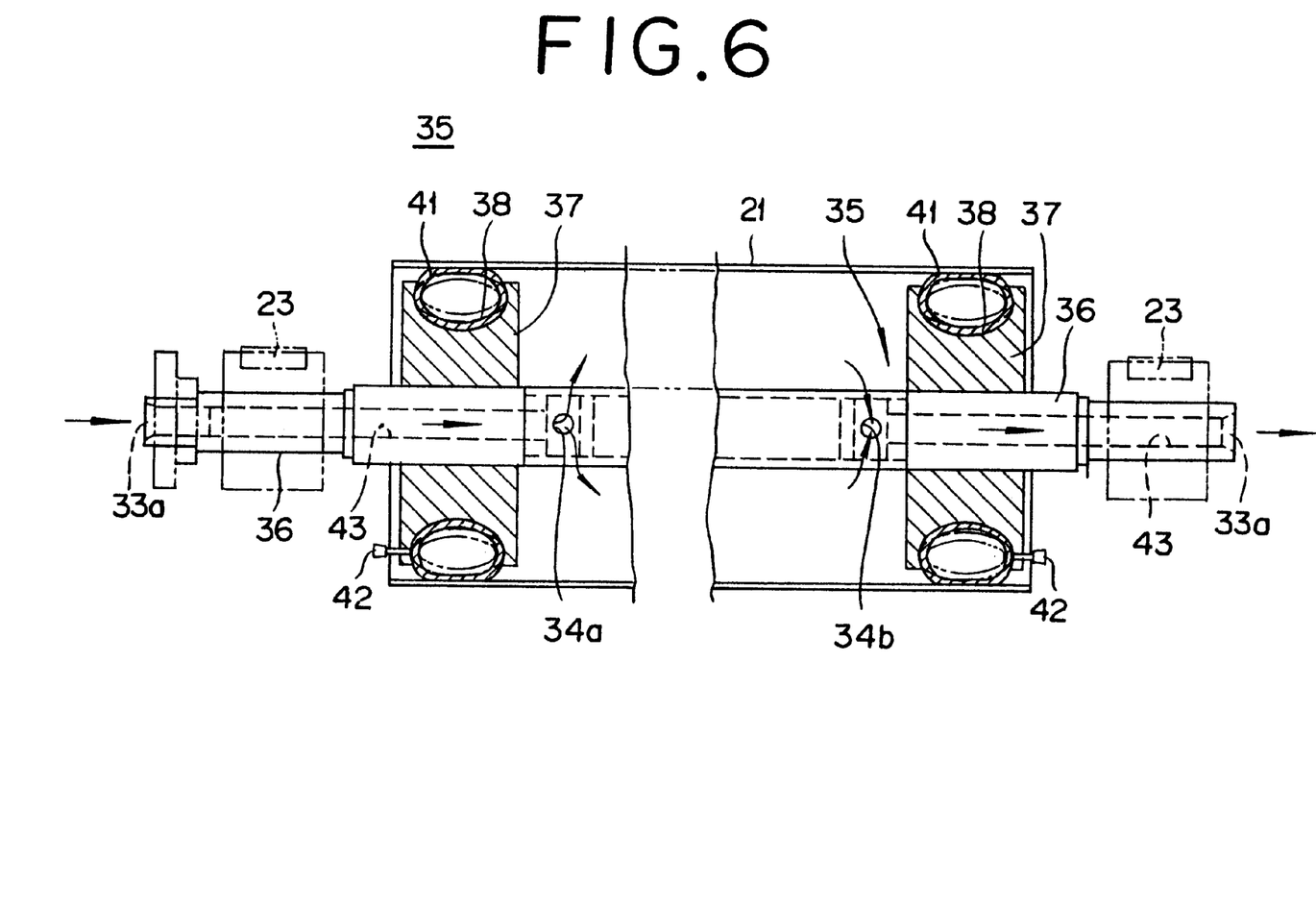
FIG. 6 is a sectional view of another forming drum unit.

FIG. 6 shows a modified example of the drum support unit 25. This drum support unit 35 comprises a single hollow or solid drum shaft 36 supported by bearings 23, a support block 37 affixed to each end of this drum shaft 36 and an expanding support bag 41 fitted on a holding groove 38 formed on the circumference of each block 37.

Each of these expanding support bags 41 expands due to the fluid such as gas supplied by an inlet port 42 and a portion of it protrudes from the holding groove 38 to support the end of the sleeve 21 from the inside. Consequently, not only it provides a good support to the sleeve 21, but also prevents the leakage of the fluid for the sleeve that flows through the sleeve 21.

Although it is not shown here, the inlet port 42 used to feed air into the expanding support bag 41 may be provided through the drum support shaft 36 and the support block 37 instead of being directly provided on the expanding support bag 41.

Concerning the flow route, the fluid for the sleeve is supplied from the inlet port 33a opening on the end of the drum support shaft 36, flows through the fluid supply passage 43, spouts from several spouting ports 34a provided on the drum support shaft 36 between the support blocks 37, flows through the fluid support passage 34 on the other side, and exits from the outlet port 33b.

Figure 7:
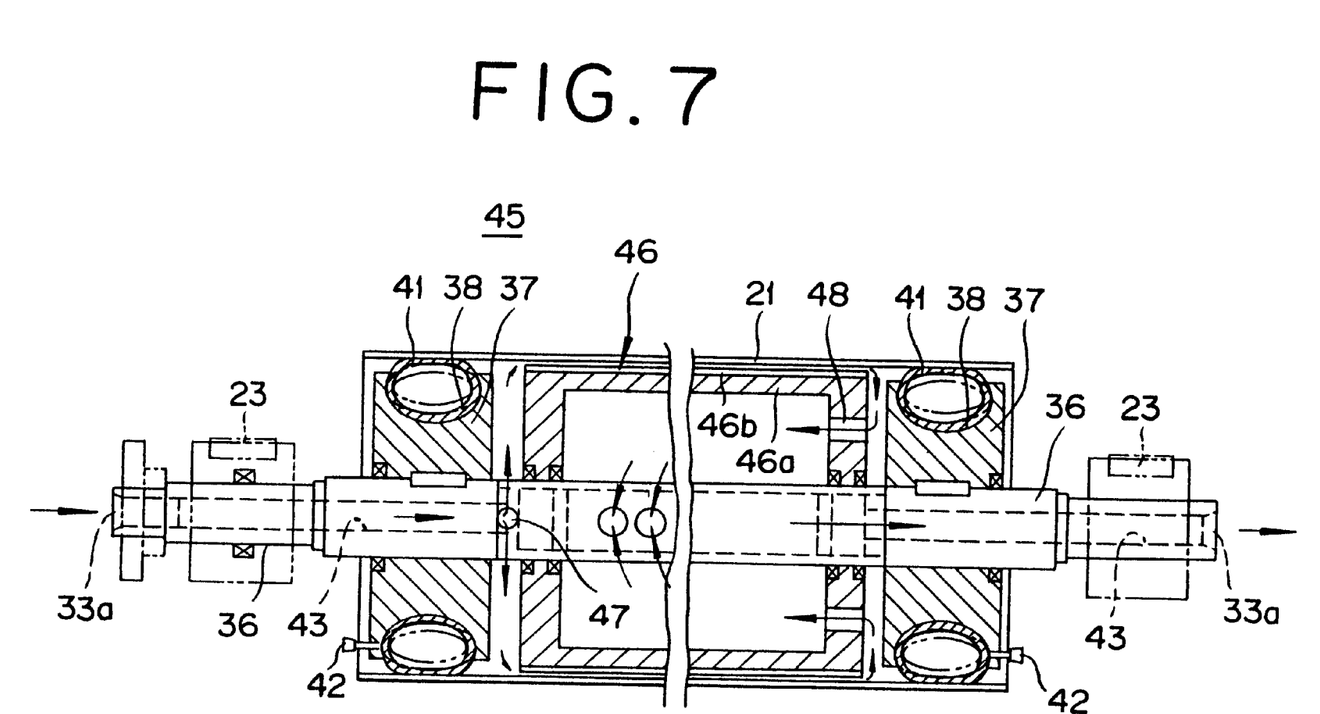
FIG. 7 is a sectional view of yet another forming drum unit.

FIG. 7 is another modified example of the drum support unit. This drum support unit 45 is designed in such a way that an inner roll 46 rotates with the drum support shaft 36 while maintaining a desired gap between it and the inner surface of the sleeve 21. Incidentally, the inner roll 46 is made by coating the outer surface of a metal roll 46a made of stainless steel and the like with an elastic material 46b such as rubber.

In this drum support unit 35, the fluid for the sleeve is supplied from the inlet port 33a provided on the end of the drum support shaft 36, flow through the fluid supply passage 43, spouts from several spouting ports 47 provided on the drum support shaft 36 between the support blocks 37 and the inner roll 46, flows through the gap between the inner roll 46 and the sleeve 21 into the inner space of the inner roll 46 through an induction port 48 provided on the right end of the inner roll 46, enters discharge ports 49 provided on the drum support shaft 36 inside this inner space, flows through the fluid supply passage 43, and exits from the outlet port 33b.

This constitution allows the sleeve 21 and the inner roll 46 to be concentric with the drum support shaft 36, so that the seals of rotating parts and the bearings become common, thus making the structure simpler and lighter, minimizing the chance of leakage of the fluid for sleeve for a long period of usage and making the maintenance easier.

In any of the drum support unit 25, 35 and 45, the fluid for the sleeve supplied into the expanding support bag 31 or 41, or the forming drum unit 20 is used for the purpose of retaining the shape of the sleeve 21 and cooling it while the sleeve 21 is pressing the molten plastic material W in conjunction with the forming drum 15, so that it is preferable to use a fluid with a good cooling characteristic or heat transfer property such as water, ethylene glycol solution or heat-transfer oils, but the invention is not limited to those liquids; the fluid can be either gas, liquid or viscous material. What is required is the substance that can cause the sleeve 21 to flex inward along the outer surface of the forming roller 15 so that the forming drum unit 20 contacts the forming roller 15 under pressure contacting on the outer surface of the forming roller 15 forcefully or provides a small clearance between the two members 15 and 20, thus to form the molten plastic material W into a desired sheet form. Also, this fluid for the sleeve can be circulated.

In this embodiment, the pressure adjustment unit 50 is provided to adjust the contact pressure of the forming drum unit 20 against the outer surface of the forming roller 15. This pressure adjustment unit 50 is used for minutely adjusting the slide frames 22 that moves the forming drum unit 20 back and forth.

Figure 3:
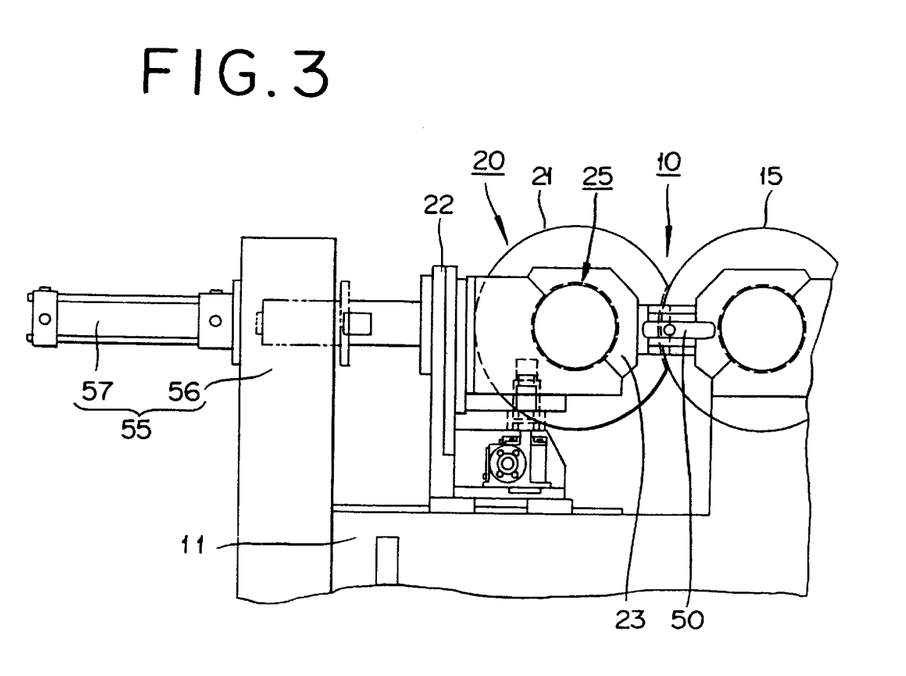
FIG. 3 is a partial cutaway enlarged side view of the essential part of FIG. 2.

For example, as shown in FIGS. 1 and 3, the contact pressure of the forming drum unit 20 is adjusted by means of having a cotter 52 between the back surface of the high portion at the front part of the forming block 11 and the front surface (for example, bearing 23) of the slide frame 22, and moving the cotter right and left or up and down.

More specifically, the contact pressure of the forming drum unit 20 is adjusted by means of having the cotter 52 between a slide block 51 provided on the bearing 23 and the back surface of the high portion at the front part of the forming block 11, forming the abutting surface of the slide block 51 and/or the back surface of the forming block 11 that abuts against the cotter 52 as a slanted surface, and moving the cotter 52 right and left or up and down at the back surface of the base block 11 by means of turning an adjusting screw 53, thus causing the slide frame 22 to move back and forth via the slide block 51.

Each slide frame 22 on the right side and the left side slides back and forth on the rear portion of the forming base block 11 by means of a slide adjustment unit 55 respectively.

This slide adjustment unit 55 comprises a slide cylinder 57 affixed to a cylinder stay 56 erected at the back portion of the forming base block 11 wherein the end of the piston rod of the cylinder 57 is affixed to the back end of the slide frame 22.

As this slide cylinder 57 operates, it moves the slide frame 22 back and. forth via slide guide 58, thus adjusting the contact pressure of the forming drum unit 20 on the outer surface of the forming roller 15.

The forming drum unit 20 is equipped with a temperature control mechanism (not shown) to heat or cool the molten plastic material W for adjusting the temperature of the molten plastic material W through the temperature control of the forming drum 20.

This temperature control mechanism can be provided inside the expanding support bag 31 or 41 or the forming drum 20.

Next, the process of forming the plastic sheet S from the molten plastic material W in the present embodiment.

First of all, the height of the die 3 is adjusted relative to the forming mechanism 10 by means of operating jack units 12. This is done to adjust the time and distance that the molten plastic material W takes until it reaches the forming mechanism after it left the die, to the prescribed values considering the degree of its cooling.

Next, the forming drum unit 20 is filled with the fluid for the sleeve to cause the expanding support bag 31 to expand. The fluid for the sleeve is sealed inside the forming drum unit 20 by means of the expanding support bag 41, which has expanded, and does not leak out, it causes the sleeve 21 to expand. Moreover, since the expanding support bag 31 is restrained on the side, it expands only radially and does not expand sideways when the fluid is filled, thus supporting the sleeve 21 snuggly from the inside and causes it to abut against the forming roller 15 securely.

As the drum support unit 25 comprises the hollow drum support shaft 26 having the closed-end cylinder 26B and the expanding support bag 31, the expanded expanding support bag 31 supports the sleeve 21 from the inside on almost the entire outer circumference thereof, providing a uniformly distributed pressing action at any point of the sleeve 21 to form the molten plastic material W between it and the forming roller 15.

The drum support units 35 and 45 are so constructed that the doughnut shaped expanding support bags 41 surround the outer circumference of the supporting blocks 37. Thus, the units 35 and 45 support the sleeve 21, which is fitted on the outside of the expansion bags 41, securely at both ends when air is introduced into the expansion bags to expand, and the expanding action of the fluid for the sleeve supplied into the forming drum unit 20 provides the evenly distributed pressing action to the molten plastic material W to form it in conjunction with the forming roller 15.

The expanding support bags 41 are held in the holding groove 38 of the supporting blocks 37. Thus, the bags 41 will not slip off the supporting blocks 37 and always support the sleeve 21 securely from the inside.

The circumference of the sleeve 21 thus expanded makes a tight contact flexing inward with a flexibility on the outer surface of the forming roller 15 as a result of the combined action of the expansion force due to the fluid for the sleeve packed inside and the curvature of the outer surface of the forming roller 15, so that the contact length of the two members, i.e., the forming distance is practically increased, thus providing a highly accurate and sure forming operation.

When the molten plastic material W is charged from the die 3 into a gap between the rotating forming roller 15 and the forming drum unit 20 of the forming mechanism 10, the material W is pressed between the outer surface of the forming roller 15 and the forming drum unit 20, which is pressed against the former, and is formed into a plastic sheet S having a desired thickness corresponding to the pressure and/or clearance set up between the outer surface of the forming roller 15 and the forming drum unit 20.

In this case, the contact pressure can be controlled by means of the pressure of the fluid, such as air, filling the expanding support bag 31 or 41, and the forming temperature of the plastic sheet S can also be controlled by adjusting the temperature of the fluid for the sleeve, hence the temperature of the forming drum unit 20, as needed.

The contact pressure or the clearance can be adjusted either by means of moving the adjusting screw 53 relative to the cotter 52 in the pressure adjustment unit 50 or by means of adjusting the contact pressure of the entire forming drum unit 20 against the forming roller 15 using the slide adjustment unit 55.

Any fluctuation of the supply of the molten plastic material W, which occurs between the outer surface of the forming roller 15 and the forming drum unit 20 as the molten plastic material W is charged from the die 3, can be corrected by adjusting the contact pressure of the forming roller 15 as to the forming drum units 20 on right and left.

As the forming process is executed under the adjusted contact pressure between the forming roller 15 and the forming drum unit 20 with inherent flexibility, no air pockets will be induced into the contact area during the forming process, the plastic sheet S with the desired thickness will be obtained through the adjustment of the contact pressure alone, and the formed surface will stably have uniform mirror-finish or target patterns as the mirror-finish or pattern-finish surface of the sleeve 21 will be directly copied.

The replacement of a worn-out sleeve 21 or replacement with another sleeve 21 having a specific mirror-finish or pattern can be easily executed by discharging the air or fluid for the sleeve supplied to the expanding support bag 31 or 41 to reduce the size of the expanding support bag 31 or 41.

Since the sleeve 21 is made of a thin pipe, it is not only easy to fit it against the outer surface of the forming roller 15, but also it is very inexpensive, which, in turn, makes the plastic sheet S is very inexpensive. Not only that, because it is light, it is easy to replace and handle at site.

The plastic sheet S thus formed is sent to the annealing unit 2, gradually cooled, taken up by the designated take-up roller (not shown), or cut to. size to be stacked up, and becomes a product.

The present invention should not be construed to be limited to the first embodiment and the forming drum 20 can use an arc-like sleeve 21a to be explained below.

The second embodiment using the arc-like sleeve 21a will be explained referring to FIGS. 8 through 11. Those members in FIGS. 8 through 11 that are same as those in FIGS. 1 through 7 are identified by the same numeric keys, and the members of the same function are identified by adding suffix "a" to the same numeric keys, in which case explanations may be omitted.

The forming apparatus of the second embodiment for forming plastic sheets is basically similar to that of the first embodiment, but is different roughly from the first embodiment in that it uses the arc-like sleeve 21a for a forming drum unit 20a and a correction device 60 for preventing positional deviations of the arc-like sleeve 21a.

However, this correction device 60 is very preferable when it is used in the second embodiment, but it also goes without saying that it can be used for the first embodiment to prevent the displacement of the sleeve 21.

The forming apparatus of the second embodiment comprises, similar to that of the first embodiment, a forming mechanism 10a placed on a forming base frame 1 mounted on a proper mounting surface, an annealing unit 2 provided on the front (right side of FIG. 8) of the forming mechanism 10a, a die 3 that supplies molten plastic material W, and jack units 12 provided at both ends of the forming base frame 1.

Figure 8:
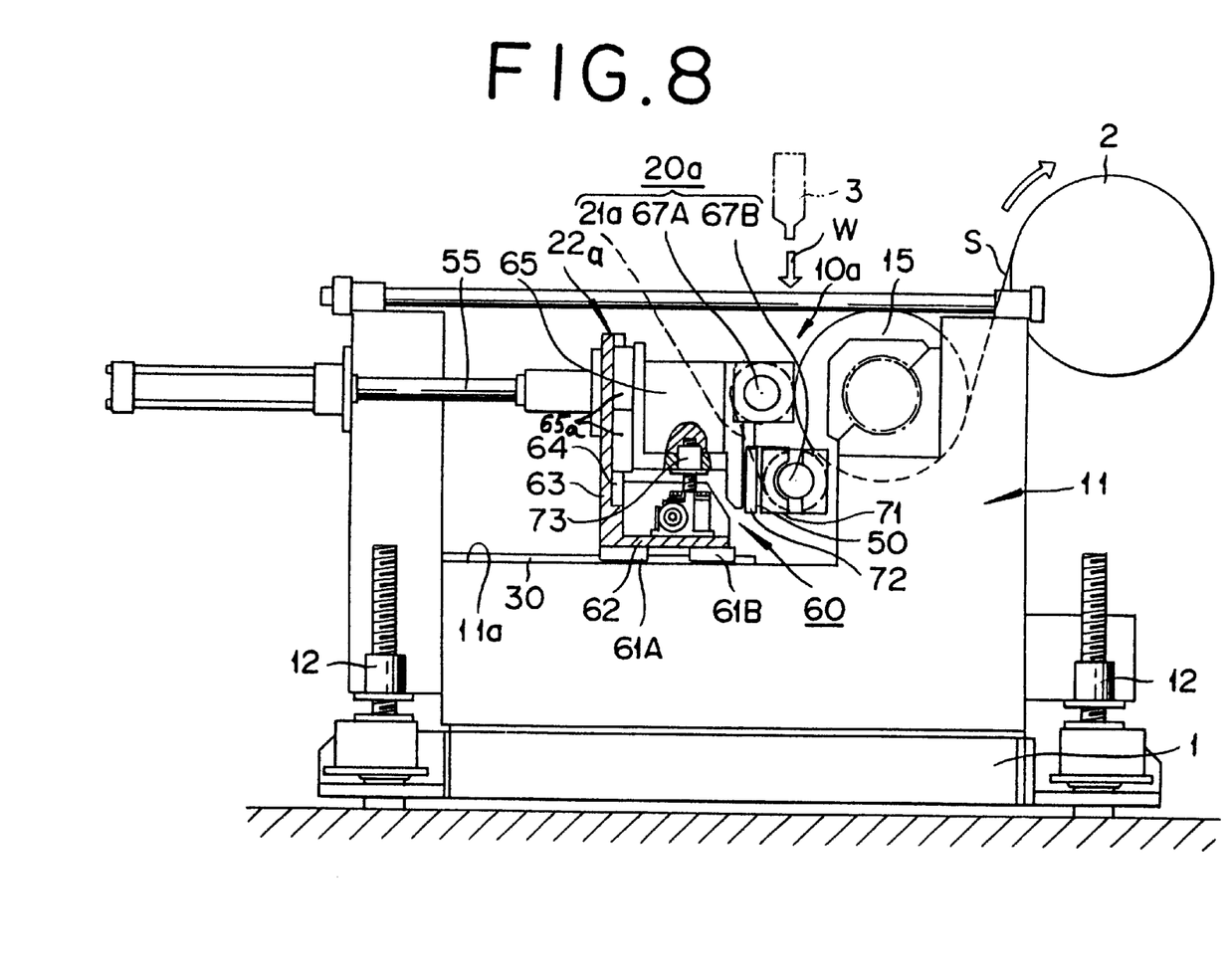
FIG. 8 is a partial cutaway side view of the second embodiment of the invention.

The forming mechanism 10a comprises, as shown in FIG. 8, a forming base blocks 11 arranged in the right and left direction (perpendicular to the page), a forming roller 15 rotatably supported in front (right side of the page) and above and between the two forming base blocks 11, a forming drum unit 20a that abuts against a portion of the outer surface of the forming roller 15 in an arc, a pressure adjustment unit 50 for adjusting the contact pressure that forces the forming drum unit 20a to contact the outer surface of the forming roller 15, a slide adjustment unit 55 as a fluid-operated cylinder unit that adjust the forward and backward position of the forming drum unit 20a relative to the outer surface of the forming roller 15, and the correction device 60 that corrects the positional deviation or positioning error of the forming drum unit 20a.

Each of these forming base blocks 11 is a plate, as shown in FIG. 8, generally shaped higher in the front and lower in the back, and is supported by the jack units 12 mounted on the front and back areas of the base frame 1.

In the back side of the forming base blocks 11, a guide rail 30 is formed on the horizontal surface 11a of each forming base block 11, and a slide frame 22a, which is generally L-shaped in cross section, is mounted on this guide rail 30 via slide members 61A and 61B.

This slide frame 22a comprises a horizontal member 62, to which the slide members 61A and 61B are attached, and a vertical member 63. This vertical member 63 is attached, on its back side, with the slide adjustment unit 55 as a liquid-operated cylinder unit and, on its front side, with an elevating guide rail 64 extending vertically. A sliding member 65a is mounted on this elevating guide rail 64 to be able to move up and down, and a roller block 65 is mounted on this slide member 65a.

Incidentally, the bottom surface of the roller block 65 is supported by the correction device 60, which will be explained below.

The forming roller 15 is positioned at a fixed location and is rotatably supported by the forming base blocks 11 via bearings, is equipped with a gear 15a at an end thereof, and is driven by a motor M1 (ref. to FIG. 11) via a reduction mechanism G1 and the gear 15a.

The forming drum unit 20a comprises a sleeve 21a, which is a thin annular member made of nickel similar to the one mentioned before and has flexibility in the radial direction, and a pair of support rollers 67A and 67B provided one on top of the other inside the sleeve 21a, wherein the sleeve 21a is supported by the pair of support rollers 67A and 67B, and the rotating force of the forming roller 15 is transmitted via the plastic material W, thus causing it to circulate between the pair of support rollers 67A and 67B by means of the plastic material W.

However, the invention is not be limited to the above, the sleeve 21a can be directly driven by the support rollers 67A and 67B to transfer the plastic material W.

The upper support roller 67A has a shaft 68 extending from both ends of the hollow main body, and the shaft 68 is supported rotatably by the roller block 65 via bearings 69 and supplies a fluid such as water via a joint J1.

The external surface of the outer race of bearings 69 that support the right and left end of the shaft 68 is spherical-shaped, so that if one of the bearings is displaced, the other bearing can swivel still maintaining the position, allowing such a displacement to a degree.

On the other hand, the lower support roller 67B also has a shaft (not shown) that extends from both ends of the hollow main body, and this shaft is independent of the roller block 65 and supported rotatably, via bearings, by a support plate 71 that is located in the front part of the roller block 65, and supplies a fluid such as water via a joint (not shown) This shaft is also supported by bearings that can swivel while maintaining the position similar to the above.

The pressure adjustment unit 50 comprising a slide member 72 and a cotter 52 is provided between the support plate 71 and the roller block 65, wherein the cotter 52 is driven by a motor M3 of the pressure adjustment unit 50 via reduction mechanism G3, thus moving the lower support roller 67B up and down relative to the roller block 65, thus to make a fine adjustment of its position at the front end of the roller block 65.

The pressure adjustment unit 50 with the cotter 52 is essentially the same as that of the first embodiment, so that its detail explanation is not repeated here.

Figure 9:
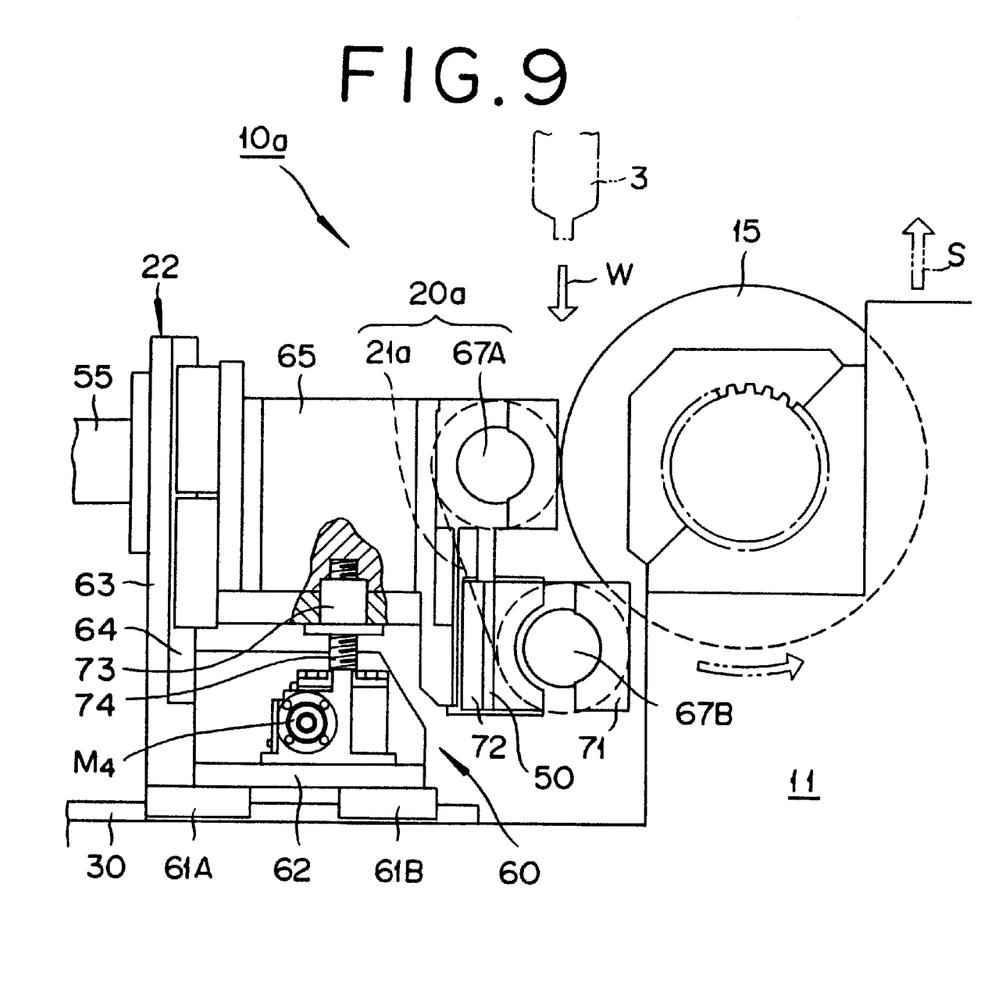
FIG. 9 is an enlarged side view of the essential part of the second embodiment.

Since the lower support roller 67B is located forward of the upper support roller 67A as shown in FIGS. 8 and 9, the sleeve 21a wrapped around the two support rollers 67A and 67B is assuming a forwardly downward slanted position.

The distance between the lower support roller 67B and the upper support roller 67A is controlled by a liquid-operated cylinder unit (not shown) provided between the support plate 71 and the specific position of the roller block 65 and the tension of the sleeve 21a, which is wrapped around the rollers, can be controlled by adjusting the distance between the support rollers 67A and 67B.

The tension of the sleeve 21a, which is wrapped around the support rollers 67A and 67B, can be adjusted not only by the liquid-operated cylinder unit mentioned above, but also by means of the pressure adjustment unit 50. Since the pressure adjustment unit 50 can minutely adjust the distance between the lower support roller 67B and the forming roller 15, the tension of the sleeve 21a can be precisely and easily adjusted by the process as well.

The plastic sheet S formed by the forming mechanism 10a contacts the forming roller 15 and the sleeve 21a constantly with a very strong adherence force. The sleeve 21a is simply wrapped around the support rollers 67 and is not driven in unison with the support rollers 67. Accordingly, the sleeve 21a may cause positional deviations due to the pull of the plastic sheet S as a result of its many hours of operation.

The positional deviations may occur, for example, when there is a difference in the thermal expansion ratios arising from that several kinds of molten plastic materials W are being formed simultaneously and the temperature is different from left to right, or when there is a difference in the forces applied on the right and left sides due to the surface patterns of the plastic sheet S. Since these positional deviations can degrade the product quality and reduce the product value, they have to be corrected immediately as they are detected.

In the second embodiment, therefore, the positional deviations of the sleeve 21a are corrected by the correction device 60.

The correction device 60 according to this embodiment comprises jack units provided on the horizontal member 62 of the slide frame 22a as shown in FIG. 9. The purpose of the jack units is to adjust the vertical position of each roller block 65. The actuation of one of the jack units causes, via the corresponding roller block 65, the vertical position of the corresponding end of the support rollers 67, namely, the position of the end of the support rollers 67 in the direction of the product transfer (direction of the arrow) to be displaced. It results in adjusting the positional deviation of the sleeve 21a in a direction perpendicular to the direction of the product transfer.

The correction device 60 comprises: a nut 73 attached to the roller block 65, a screw shaft 74 that meshes with the nut 73, a worm wheel attached to the screw shaft 74, a worm (not shown) that meshes with the worm wheel, and a jack motor M4, which drives the worm for moving the roller block 65 up or down.

Incidentally, the jack motor M4 can run forward or backward directions controlled by a control unit 75 (ref. to FIG. 9), so that it can drive the roller block 65 up or down via the nut 73.

Figure 10:
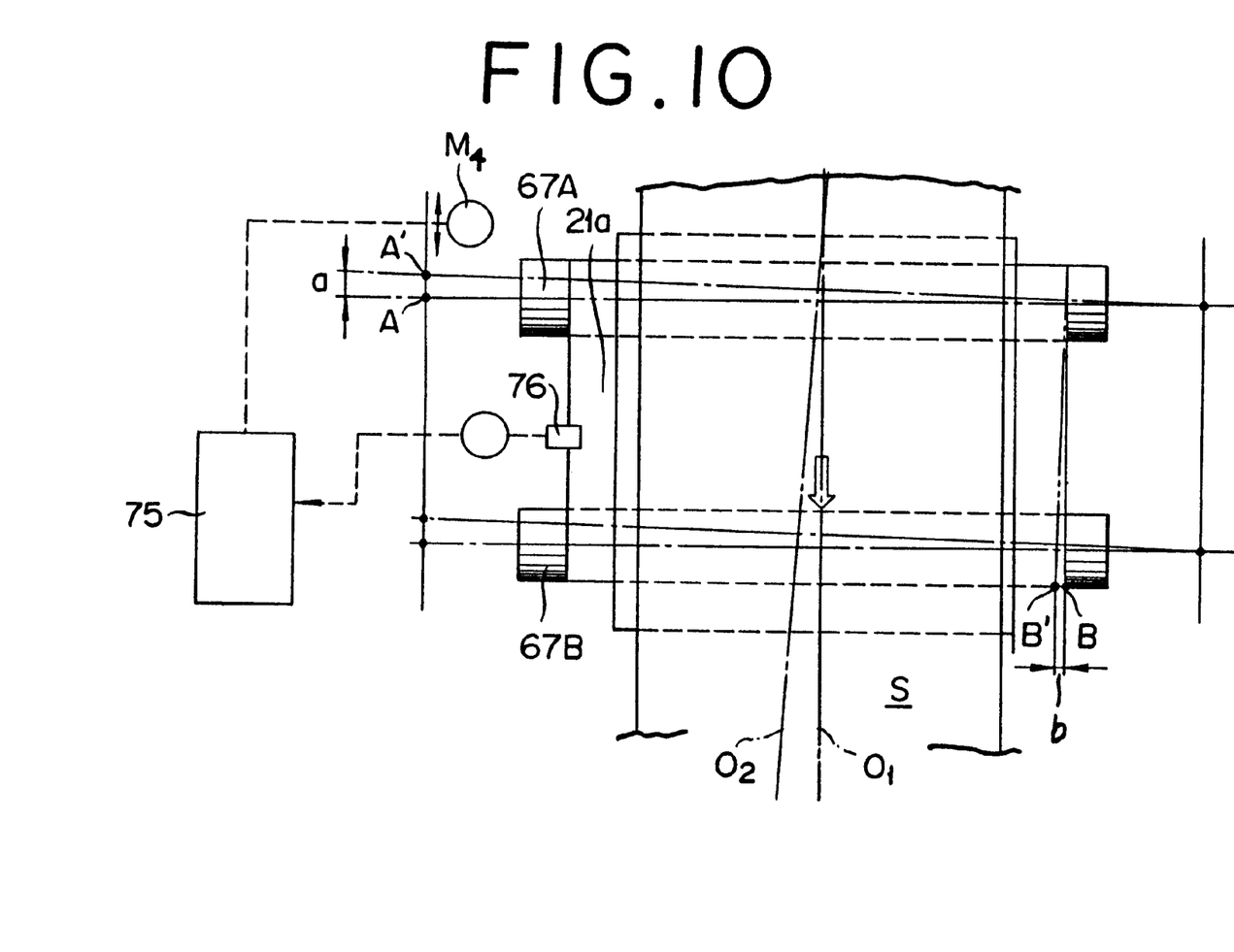
FIG. 10 is a plan view of the essential part of the second embodiment.
Figure 11:
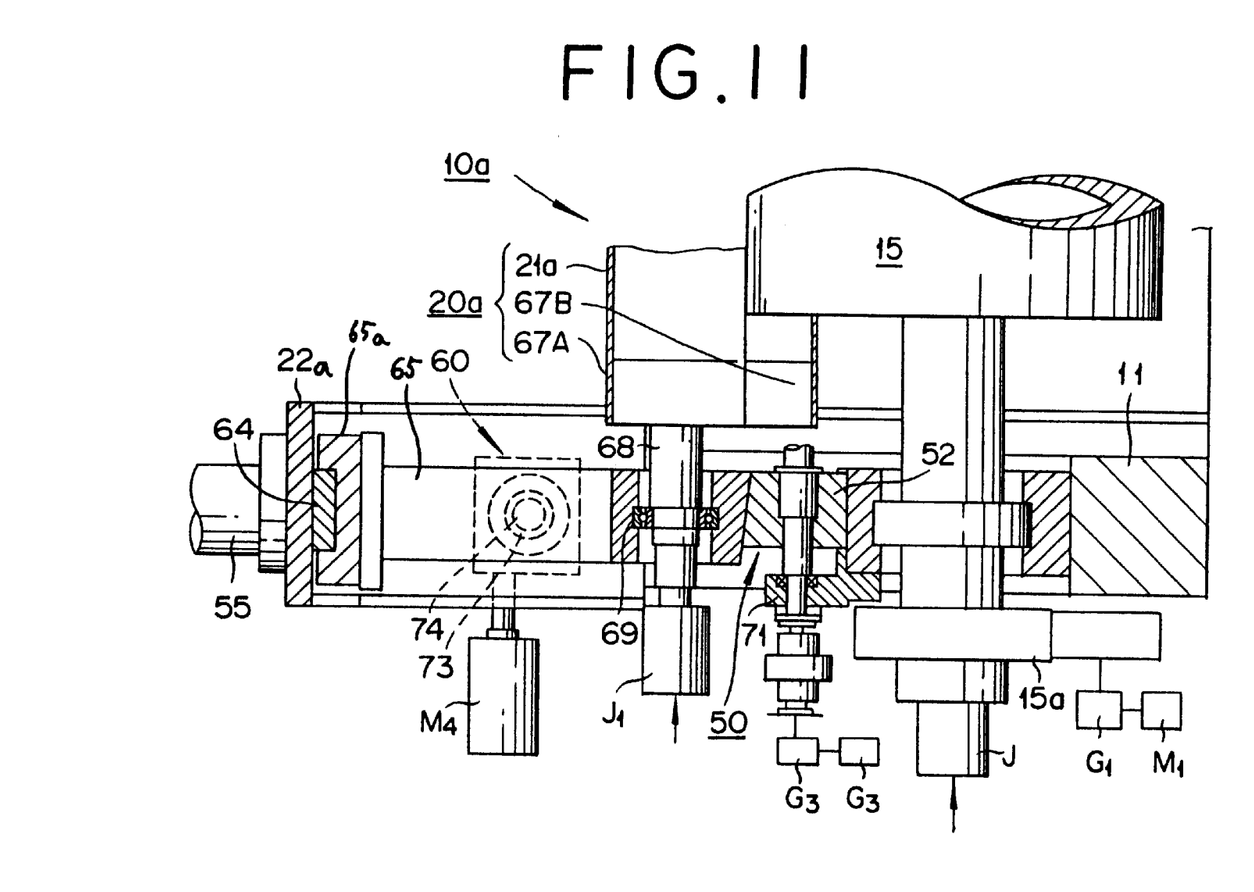
FIG. 11 is a partial cutaway plan view of the essential part of the second embodiment.

The control unit 75, as shown in FIG. 10, is designed so that it actuates the jack motor M4 under a PID control scheme to run it at a desired speed in forward or reverse direction depending on the signal from a micro-deviation sensor 76, which constantly watches the position of one of the side edges of the sleeve 21a incorporated in the forming drum unit 20a of the forming mechanism 10a.

The process of forming the plastic sheet S of a certain thickness from the molten plastic material W in this embodiment will be explained below:

First, the distance between the die 3 and the forming mechanism 10a is adjusted as in the first embodiment. Also, a desired tension is applied to the sleeve 21a actuating the liquid-operated cylinder unit (not shown) and the gap between the forming drum unit 20a and the forming roller 15 is adjusted by the slide adjustment unit 55.

When these adjustments are completed, the plastic material W in a molten state is supplied from the die 3 to the forming mechanism 10a while the forming roller 15 is being rotated driven by the motor M1.

The molten plastic material W, while it is being pressed between the forming drum 15 of the forming mechanism 10a and the sleeve 21a, which is tightly wrapping the support rollers 67A and 67B of the forming drum unit 20a, is transferred through the space between the sleeve 21a and an arc-like outer surface of the forming roller 15.

In particular, the flexible sleeve 21a makes a close contact with the forming roller 15 via the molten plastic material W. And it will provide a long contact length, i.e., the forming length, any air pocket induction will be avoided due to the pressing action, thus resulting in a highly accurate forming action providing a uniform surface with an excellent mirror finish. The formed long plastic sheet S is cooled in the annealing unit 2 and wound up.

Let us suppose that the sleeve 21a has developed a positional deviation in the direction perpendicular to the direction of the transfer caused by patterns placed on the surface of the sleeve 21a or other similar reasons. For example, in FIG. 10, let us assume that the signal from the micro-deviation sensor 76 indicates a positional deviation of the sleeve 21a toward left during the formation of the plastic sheet S. In other words, the right bottom side position B of the sleeve 21a moved left by a distance "b" to the new position B' as shown by the alternate long and two short dashes lines.

In this case, the motor M4 of the correction device 60 on the left side is actuated. The actuation of the motor M4 moves the roller block 65 as well as the left end of the support roller 67A upward from the position A to A' (distance "a").

Incidentally, the centerline of the sleeve 21a moves from "O1" to "O2" as the center line after the correction. However, the direction of the flow of the plastic sheet S (direction of the arrow as an outline) stays unchanged and is aligned with the original center line O1 in the meanwhile.

The plastic sheet S, which is transferred by the drive force of the forming roller 15, has a very strong adhesive force. But the sleeve 21a has no drive source and is rotating driven only by the adhesive force of the plastic sheet S. Hence the flow direction of the plastic sheet S does not change even if the sleeve 21a is dislocated.

As a result, the centerline O2 of the sleeve 21a after correction comes to cross the centerline O1. And the sleeve 21a comes to be pulled toward the centerline O1 by a strong force of the plastic sheet S, i.e., the plastic sheet S exerts a force on the sleeve 21a to force it back to the original position. Namely, the sleeve 21a is returned to the original position dislocating itself to the right or the opposite direction.

Consequently, the positional deviation of the sleeve 21a is corrected, and the sleeve 21a comes to transfer the plastic sheet S in the normal position.

By forming always in the condition without any positional deviation, even a long plastic sheet S can be produced from the start to the end with excellent finish accuracy. This will provide a stable, good forming result, even in the case of a plastic sheet S with diagonal patterns, which normally tends to cause positional deviations of the sleeve 21a.

Moreover, since the positional deviations can be corrected simply adjusting the position of the sleeve 21a, i.e., the position of the support rollers 67, the correction procedure causes no damage to the forming drum unit 20a, thus improving the useful life of the forming drum unit 20a.

The invention should not be construed to be limited to the first and second embodiments; various modifications are possible within the gist of the claims.

For example, although the above embodiments refer to the case where the molten plastic material w is charged in the vertical direction from the die 3, i.e., the vertical extrusion system, the invention can be applied to the horizontal extrusion system wherein the material is charged horizontally.

Although the embodiments were explained referring to the case of producing thin plastic sheets from molten plastic materials W, applications of the present invention are not limited to such cases, but rather it can be applied to various other sheet products.

The entire disclosure of Japanese Patent Applications No. 09-062254 filed on Feb. 28, 1997 and No. 09-299479 filed on Oct. 16, 1997, including the specification, claims, drawings and summary is incorporated herein by reference in its entirety. the transfer direction of the sheet products.

What is claimed is:

1. A process for forming long sheet products by pressing molten plastic materials between a forming roller and a forming drum unit, each having an axis of rotation, the process comprising:

pressing said forming drum unit against the outer surface of said forming roller with a desired force to elastically flex the surface of said forming drum unit inwardly in a curve along the outer surface of said forming roller, such that air pocket induction is avoided due to the pressing, to thereby form said sheet products between said forming drum unit and said forming roller while said sheet products are transferred and pressed between said forming roller and said forming drum unit, rotating said forming drum unit about an axis perpendicular to its axis of rotation and perpendicular to the direction of travel of said sheet products, while maintaining the desired force of the contact between said forming drum unit and the outer surface of said forming roller, in order to correct positional deviations and continue the pressing and formation of said sheet products.

2. A process according to claim 1 wherein said forming drum unit consists of a pair of support rollers placed at a distance from each other and a sleeve, which is wound around them, and said step of rotating said forming drum unit is composed of moving a bearing provided at and of one of the support rollers along the transfer direction of the sheet products.

* * * * *